United States Patent
Presby

[11] 3,912,478
[45] Oct. 14, 1975

[54] METHODS OF INTRODUCING GEOMETRICAL VARIATIONS IN OPTICAL FIBERS

[75] Inventor: Herman Melvin Presby, Highland Park, N.J.

[73] Assignee: Bell Telephone Laboratories, Incorporated, Murray Hill, N.J.

[22] Filed: June 17, 1974

[21] Appl. No.: 479,820

[52] U.S. Cl. ................. 65/2; 65/5; 65/13; 65/DIG. 7; 264/210 F; 425/76
[51] Int. Cl.² ............................ C03B 37/02
[58] Field of Search ............. 65/2, 4, 13, 5, DIG. 7; 264/1, 210 F; 425/76

[56] References Cited
UNITED STATES PATENTS

| | | | |
|---|---|---|---|
| 3,063,094 | 11/1962 | Warthen | 65/12 X |
| 3,282,668 | 11/1966 | Mabru | 65/5 X |
| 3,526,569 | 9/1970 | Chopra et al. | 264/210 F X |
| 3,666,348 | 5/1972 | Marcatili | 65/DIG. 7 |
| 3,687,514 | 8/1972 | Miller et al. | 65/DIG. 7 |

*Primary Examiner*—Robert L. Lindsay, Jr.
*Attorney, Agent, or Firm*—S. Sherman

[57] ABSTRACT

The diameter and axial alignment of an optical fiber is varied by means of one or more gas streams directed against the fiber as it is being drawn. By controlling the intensity of the gas streams, the spatial distribution of the geometrical variations produced by this means can be controlled, thereby producing controlled mode coupling in the fiber.

5 Claims, 4 Drawing Figures

METHODS OF INTRODUCING GEOMETRICAL VARIATIONS IN OPTICAL FIBERS

This application relates to methods of fabricating optical fibers having prescribed spatial variations for introducing controlled mode coupling.

BACKGROUND OF THE INVENTION

In U.S. Pat. No. 3,687,514, it is shown that the mode dispersion in a multimode waveguide can be reduced by deliberately enhancing the mode conversion processes in the waveguide. This is accomplished by introducing "imperfections" into the waveguide. These imperfections include changes in the cross-sectional dimensions of the guide and/or changes in the direction of the guide axis.

The inclusion of these discontinuites tends to enhance the coupling among the various modes. The greater the coupling, the greater the probability that the wave energy will be more uniformly distributed among all of the possible modes. As a result, the time it takes for all of the wave energy to traverse the entire length of the waveguide is more nearly the same. Thus, whereas a pulse of wave energy, simultaneously launched onto an ideal waveguide in two different modes, would arrive at the output end of the guide as two pulses, separated in time by an interval proportional to the length of the guide, the same pulse propagating along a guide in which the mode coupling is deliberately enhanced would arrive as a single, somewhat broadened pulse. While random coupling among the modes tends to reduce dispersion, it also tends to increase losses due to the coupling of some of the energy from guided to unguided (radiating) mode. Accordingly, means are advantageously employed which substantially limits the coupling to among only the guided modes while minimizing the coupling among the guided and the unguided modes. For example, in U.S. Pat. No. 3,666,348, the coupling is restricted to selected pairs of guided modes by controlling the spatial periodicity of the coupling mechanism. In particular, the spatial periodicity is made equal to the beat wavelength for the two modes. In more complex systems, more complicated coupling arrangements are provided.

The broad object of the present invention is to provide convenient means for introducing geometric variations having a prescribed spatial distribution along an optical fiber waveguide.

A more specific object of the invention is to produce said prescribed geometric variations while the fiber is being pulled from a molten supply of fiber material.

SUMMARY OF THE INVENTION

In accordance with the present invention, one or more gas streams are directed against a fiber as it is pulled from a heated preform. The gas, whose intensity is modulated, serves to displace the fiber in a direction transverse to the pulling direction. This slight displacement serves to change the direction of the fiber axis and to change the diameter of the fiber. These changes are frozen into the fiber as it cools. The periodicity of these effects is determined by the modulation imposed upon the gas stream.

In one embodiment of the invention, the gas stream is modulated by a rotating disc provided with spaced apertures. By regulating the rotational frequency of the rotating disc relative to the pulling rate of the fiber, the spatial distribution of the fiber discontinuities is conveniently controlled.

In a second embodiment of the invention, the intensity of the gas stream is modulated by means of a tubing pump.

In a third embodiment of the invention, the intensity of the gas stream is modulated by means of an electromechanical gas valve.

Depending upon the complexity of the geometrical variations that are to be produced, two or more gas streams can be directed onto the fiber.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
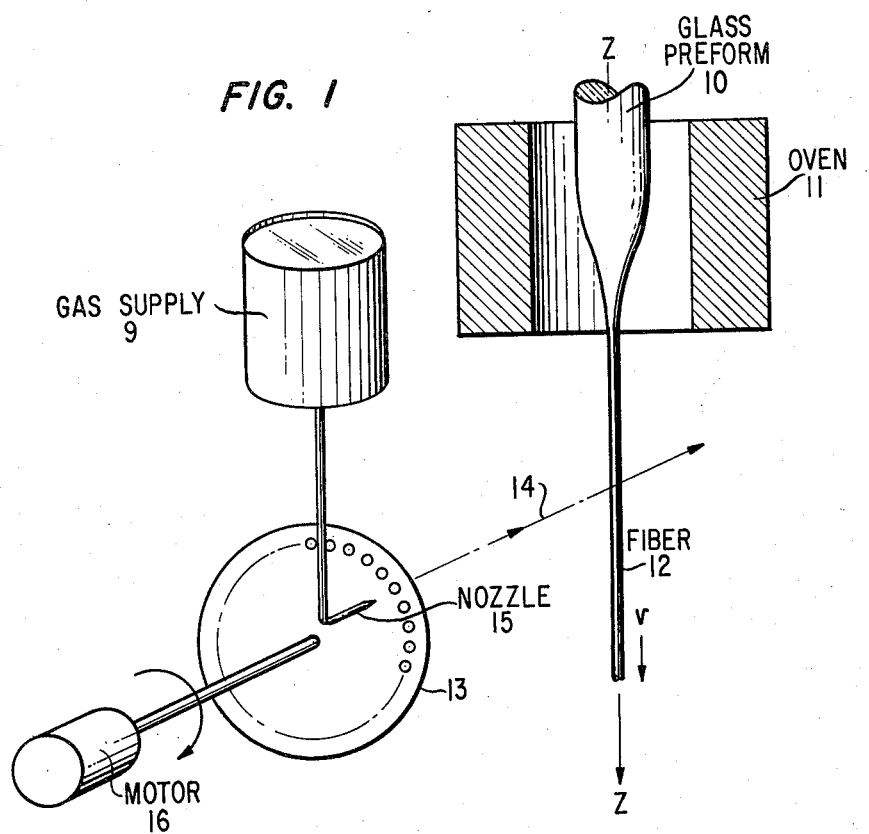
FIG. 1 shows a first arrangement for introducing geometrical variations in an optical fiber in accordance with the present invention.

Referring to the drawings, FIG. 1 shows a first arrangement for fabricating an optical fiber in accordance with the present invention using a rotating apertured disc to modulate the intensity of a gas jet. Typically, optical fibers are drawn from a glass preform by heating the glass in an oven and then pulling on the molten portion. Thus, in FIG. 1, a glass preform 10 is shown extending into an oven 11 wherein it is heated. The heated portion is drawn down at a uniform velocity $v$ to form a fiber 12. So long as the preform is subjected to a constant temperature, and a constant pulling velocity, a fiber of uniform diameter and unidirectional axial alignment is produced. However, in a fiber wherein controlled mode coupling is desired, means for inducing prescribed nonuniformities is provided. In accordance with the present invention, said means includes an apertured disc 13 and a jet of gas 14. The gas is derived from a gas source 9, and is directed onto fiber 12 by means of a nozzle 15 located on the far side of disc 13.

In operation, disc 13 is caused to rotate at a constant rotational frequency, $f$, by a motor 16. Each time an aperture appears opposite nozzle 15, a jet of gas is blown through the aperture an onto the fiber causing it to be displaced in a direction perpendicular to the direction in which it is being drawn. This produced two effects. First, it produces a slight angular displacement of the fiber axis. Second, the displacement modifies the pulling rate, thereby causing a slight change in the fiber diameter. It also produces a slight displacement of the fiber within the oven. If the oven has a relatively uniform temperature over an area through which the fiber moves, the latter displacement will not be significant. If, however, the oven is such that the displacement causes a change in the fiber temperature, this will also serve to enhance any change produced in the diameter of the drawn fiber as it is transversely displaced. This is particularly so in those cases where the heat is provided in a narrow zone by a laser. In any case, both the change in axial direction, and the change in fiber diameter are frozen into the fiber, creating local nonuniformities.

These changes are initiated every time an aperture appears between the gas nozzle and the drawn fiber. As such, the spatial distribution of these nonuniformities can be conveniently controlled by controlling the rotational frequency of the rotating disc and the location of the holes on the disc. In particular, the spacing $d$ between perturbation peaks along the fiber is related to the rotational frequency, $f$, of the disc and the fiber pulling rate $s$ by $$d = \frac{s}{nf}, \quad (1)$$

where $n$ is the number of apertures in the disc.

EXAMPLES (1) If    s = 100 cm/sec,
       n = 10,
   and   d = 1 cm, a rotation frequency, $f$, of 10 RPS or 600 RPM is called for.

(2) If    s = 100 cm/sec,
       n = 10,
       d = 0.1 cm,
   then   f = 100 RPS, or 6000 RPM.

The range of intensities of the gas stream is quite low, and corresponds to what would be obtained by blowing on the fiber. As such, the system is advantageously shielded from drafts.

Figure 2:
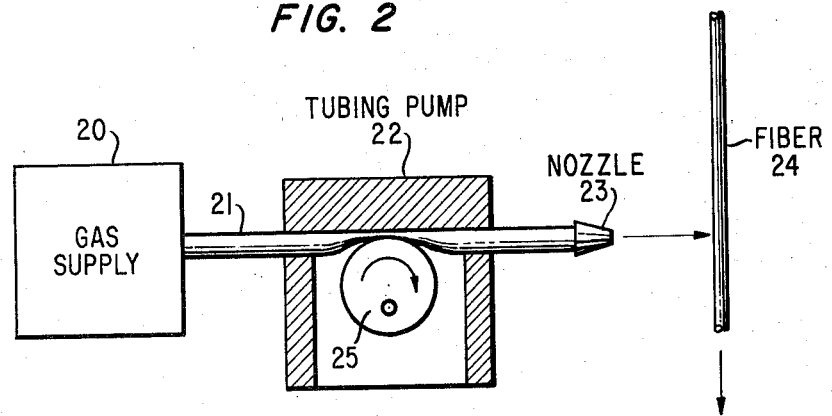
FIGS. 2 and 3 show alternate arrangements for modulating a gas stream.

FIG. 2 shows a second arrangement for modulating a gas stream. In this embodiment, a gas supply 20 is connected to a nozzle 23 by means of a length of flexible tubing 21. The tubing passes through a tubing pump which controls the flow of gas between the supply and the nozzle and, hence, onto fiber 24.

Figure 3:
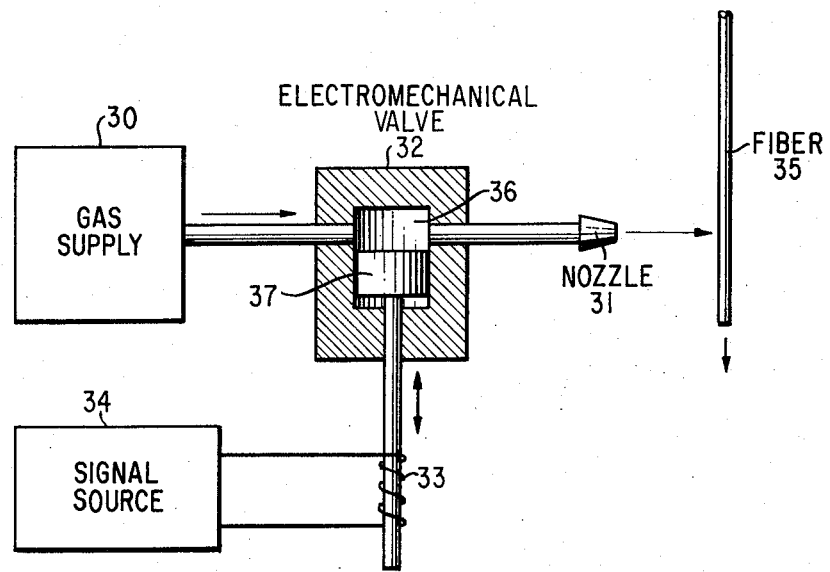

FIG. 3 illustrates an electromechanical gas valve for modulating a gas jet. In this embodiment the flow of gas between gas supply 30 and nozzle 31 is controlled by means of an electromechanical valve 32. For purposes of illustration, valve 32 includes a chamber 36 that is connected to gas supply 30 at one end, and to nozzle 31 at an opposite end. The gas flow is interrupted at intervals by a piston 37 which is caused to move up and down in response to an electrical signal applied to an electromagnet 33 by a signal source 34. In the down position, gas flows between supply 30 and nozzle 31. In the full up position, the gas flow is interrupted. For all intermediate positions, the gas flow is correspondingly varied.

The use of an electrical signal source as a means of controlling the gas flow provides a convenient means of impressing a complex spectrum of geometrical variations onto a fiber, and in cases where such is desired, an electromechanical gas control system may be preferred.

Figure 4:
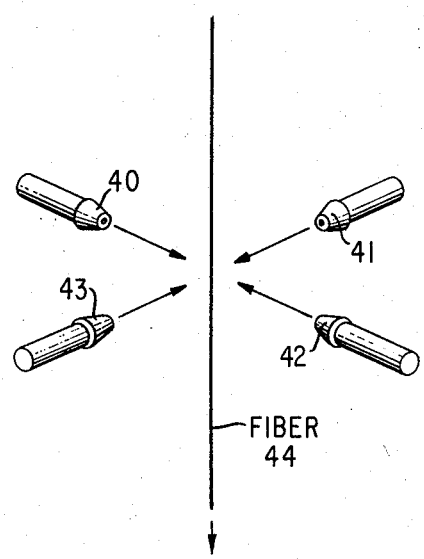
FIG. 4 shows the use of a plurality of gas streams to control the geometrical variations along an optical fiber.

FIG. 4 illustrates the use of a plurality of gas jets. In particular, four nozzles 40, 41, 42 and 43 are shown symmetrically disposed about a fiber 44. More generally the jets can be directed at different axial regions along the fiber. In any case, the gas flow to the respective nozzles is separately controlled by any one of the several means hereinabove described and, in concert, serve to control the transverse displacement of fiber 44 along two, mutually perpendicular directions.

As indicated hereinabove, relatively little gas pressure is required to practice the invention. Since the degree of mode coupling produced in the fiber is a function of the gas pressure, the latter is adjusted accordingly. A convenient procedure is to calibrate the system by varying the pressure and measuring the resulting coefficient of coupling produced in a test fiber. The data obtained in this manner can then be plotted and used thereafter as a reference.

The choice of gas is not critical. Since it serves only to deflect the fiber, any inert gas, that will not interact undesirably with the fiber material, can be used.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A method of introducing geometrical variations along an optical fiber comprising the steps of;
    heating a source of optical fiber-forming material to a softened state;
    drawing a fiber from said heated source;
    Characterized in that:
    as said fiber emerges from said heated source at least one gas stream is directed against said fiber with an intensity which varies as a function of time and is sufficient to permanently deform said fiber;
    and in that the spatial distribution of the deformations formed along said fiber varies in accordance with the intensity fluctuations of said gas stream.

2. The method according to claim 1 wherein the intensity of each gas stream is caused to vary by means of a rotating, apertured disc located between a gas nozzle and said fiber.

3. The method according to claim 1 wherein the gas is supplied through a flexible tubing;
    and wherein the intensity of each gas stream is modulated by a tubing pump.

4. The method according to claim 1 wherein the intensity of each gas stream is controlled by an electromechanical valve.

5. The method according to claim 1 wherein a plurality of gas streams are employed;
    and wherein the intensity of each gas stream is separately controlled.

* * * * *